United States Patent

Ham

[11] Patent Number: 4,583,386
[45] Date of Patent: Apr. 22, 1986

[54] METHOD TO REDUCE WELD FLASH
[75] Inventor: Emmett P. Ham, Goldsboro, N.C.
[73] Assignee: General Electric Company, Schenectady, N.Y.
[21] Appl. No.: 527,544
[22] Filed: Aug. 29, 1983
[51] Int. Cl.⁴ .......................... B21D 3/02; B21D 1/06
[52] U.S. Cl. .......................................... 72/92; 72/94; 72/111; 72/465; 228/125; 228/19
[58] Field of Search ...................................... 72/91–94, 72/197, 198, 80, 101, 465, 466, 111, 246, 366; 228/18, 19, 125; 140/112; 29/526.4, 90 R, 90.3, 90.5; 219/101, 104

[56] References Cited

U.S. PATENT DOCUMENTS

| 449,836 | 4/1891 | Thomson | 219/104 |
|---|---|---|---|
| 566,701 | 8/1896 | Rowley | 72/93 |
| 1,439,531 | 12/1922 | Schneider | 228/125 |
| 1,632,703 | 6/1927 | Humphris | 72/92 |
| 1,645,372 | 10/1927 | Cook, Jr. et al. | 228/19 |
| 2,335,710 | 11/1943 | Townsend | 72/92 |
| 2,751,675 | 6/1956 | Bieber | 228/125 |
| 2,899,853 | 8/1959 | Prutton | 72/93 |
| 3,459,027 | 8/1969 | Brownstein | 72/466 |
| 3,466,918 | 9/1969 | Marcovitch | 72/101 |
| 3,495,428 | 2/1970 | Marcovitch | 72/91 |

FOREIGN PATENT DOCUMENTS

| 2719084 | 11/1978 | Fed. Rep. of Germany | 72/94 |
|---|---|---|---|
| 26860 | of 1914 | United Kingdom | 72/93 |
| 978949 | 1/1965 | United Kingdom | 72/93 |

Primary Examiner—Lowell A. Larson
Attorney, Agent, or Firm—J. F. McDevitt; Philip L. Schlamp; Fred Jacob

[57] ABSTRACT

The method and apparatus is disclosed to reduce the size of weld flash located at the junction of two workpieces each having a cylindrical contour and which have been butt-welded together. This method and apparatus employ roller members which positively feed the butt-welded workpieces through a slot opening smaller in width than the original diameter of the weld flash. In the preferred embodiment, a roller is spaced apart from the stationary block member to establish the slot opening while the workpieces are rotated while being fed through the opening in order to exert sufficient mechanical force with the sides of the slot opening to reduce the diameter of the weld flash by compaction during passage therethrough.

9 Claims, 4 Drawing Figures

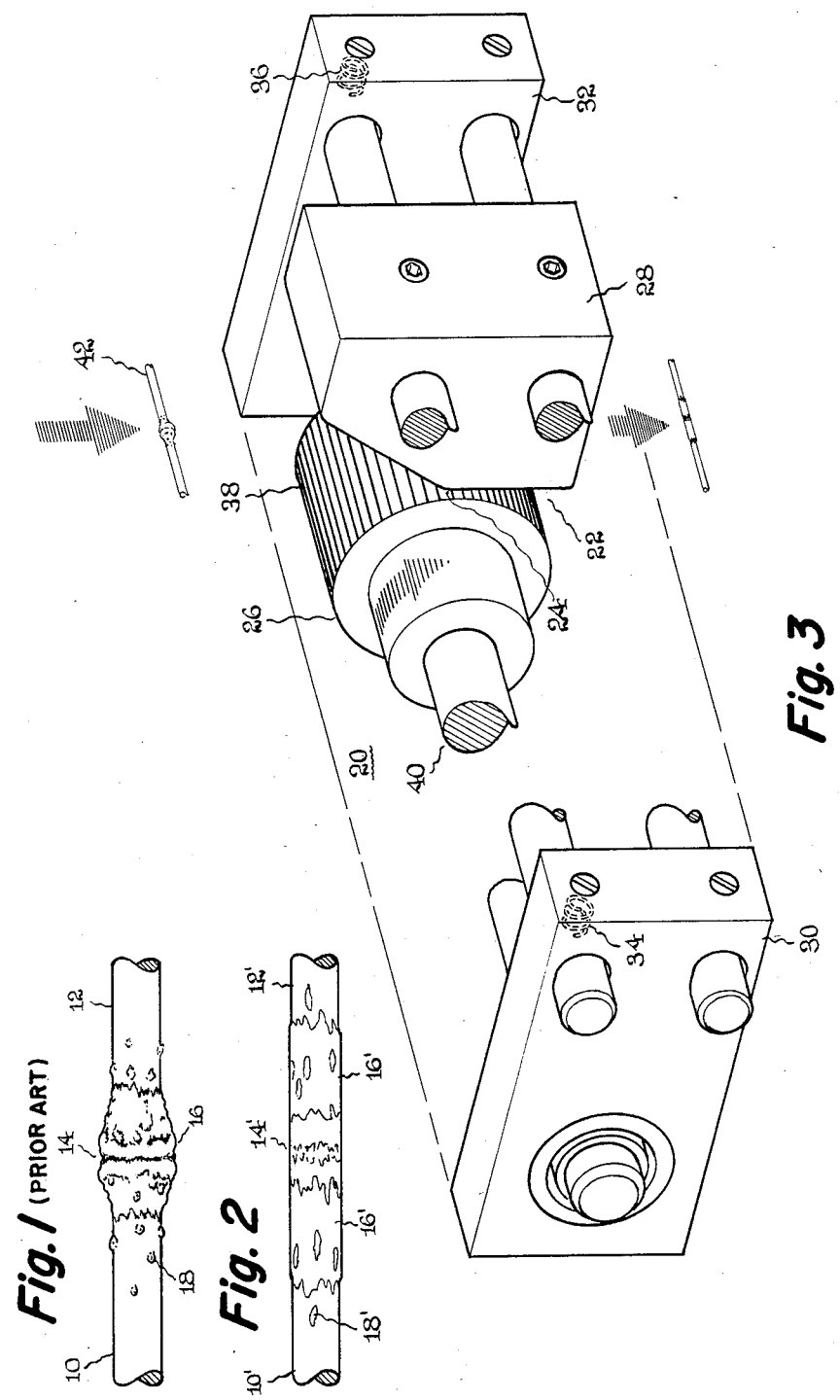

METHOD TO REDUCE WELD FLASH

BACKGROUND OF THE INVENTION

The butt-welding of cylindrical workpieces, including rod and tubes wherein the ends of each workpiece are joined together has been carried out for a considerable time period by various welding processes. The occurrence of weld flash located at the junction of the two workpieces results in numerous and often serious problems generally depending upon the end product application for the particular butt-welded workpieces. A particularly serious problem arising in this manner is occasioned when small diameter wires of various refractory metals are butt-welded together to serve as the in-lead components for electric lamps. Since these composite in-lead wire constructions are frequently required to be hermetically sealed in the closed lamp envelope, any irregularity in the wire contour can and does frequently produce seal failures. It would thereby be desirable for this product application and others to provide a means to reduce the diameter of the weld flash between the junction of two cylindrical workpieces which have been butt-welded together in a simple and effective manner.

It would also be desirable in accomplishing the foregoing objective to provide an apparatus of relatively simple construction which simply reduces the weld flash diameter without further need to actually remove said material. It becomes possible in this manner to avoid mechanical grinding or shearing operations as well as other non-mechanical techniques for removal of unwanted material such as chemical etching and the like. It would be still further desirable if the apparatus being employed to simply reduce the weld flash dimensions does so in a continuous single step operation requiring minimum handling of the welded workpieces.

SUMMARY OF THE INVENTION

It has now been discovered that the weld flash ordinarily encountered at the junction of two cylindrical workpieces which have been butt-welded together can be effectively reduced in size by simply exerting sufficient mechanical force on said weld flash material to displace said material to both sides of the weld joint. Specifically, the present method for reduction in the size of weld flash located at the junction of two workpieces each having a cylindrical contour and which have been butt-welded together involves:

(a) positively feeding the butt-welded workpieces by roller means including at least one roller member while said butt-welded workpieces are aligned transverse to the rotational direction through a slot opening smaller in width than the original diameter of the weld flash, (b) said roller member including a gripping surface to rotate the butt-welded workpieces for passage through said slot opening, (c) varying the width of said slot opening during passage of the workpieces therethrough, (d) exerting sufficient mechanical force with the sides of said slot opening to reduce the diameter of the weld flash by compaction, and (e) removing the workpieces from the slot opening.

In the foregoing manner, the weld flash diameter is effectively reduced without additional removal steps and can be carried out automatically on a single apparatus. A suitable apparatus for carrying out said foregoing described process comprises:

(a) roller means including at least one roller member which positively feeds the butt-welded workpieces while aligned transverse to the rotational direction of said roller member through a slot opening smaller in width than the original diameter of the weld flash, (b) a gripping surface on said roller member which rotates the butt-welded workpieces during passage through said slot opening, and (c) meanings to vary the width of said opening as the butt-welded workpieces are being fed through said opening.

A preferred embodiment for said apparatus employs a roller member spaced apart from a stationary block member as the roller means in establishing said slot opening but it is contemplated that said roller means can also consist of a pair of roller members traveling at different rotational speeds as well as opposite rotational directions. Additionally, said roller means employing a pair of roller members can be roller members having different diameters and with said roller members being driven by a single powered drive means to rotate both roller members at a relatively constant speed.

BRIEF DESCRIPTION OF THE DRAWING

FIG. 1 is a perspective view depicting a typical weld flash joint between two cylindrical workpieces which have been butt-welded together before processing in accordance with the present invention.

FIG. 2 depicts the same weld joint illustrated in FIG. 1 after processing in accordance with the present invention.

FIG. 3 is a perspective view illustrating a preferred apparatus used to practice the present method.

DESCRIPTION OF THE PREFERRED EMBODIMENTS

Figure 4:
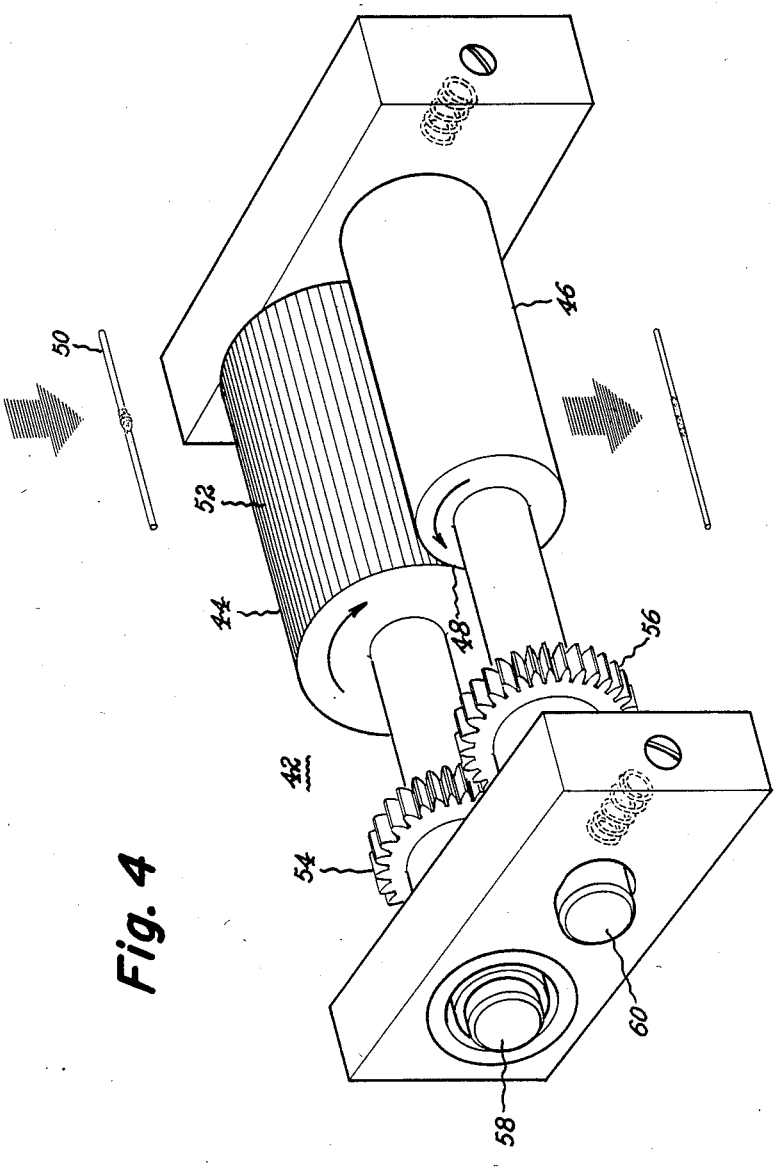
FIG. 4 is a perspective view for a different preferred apparatus of the present invention.

Referring to FIG. 1, a pair of cylindrical work-pieces 10 and 12 are shown having been butt-welded together at one end of each workpiece to produce a weld joint 14. Said weld joint 14 customarily includes a deposit of weld material 16 having dimensions greater than the diameter of the welded workpieces along with weld spatter deposits 18 on the circumference of both welded workpieces further removed from the weld joint. Both of said irregularities 14 and 18 in the cylindrical contour of the welded workpieces constitute impediments to further handling and processing of the joined members such as previously described.

In FIG. 2 there is depicted the same welded workpieces 10' and 12' following reduction in size of the weld joint 14' according to the present improvement. Specifically, the weld material 16' at said weld joint 14' has been displaced by compaction to both sides of the weld joint as relatively uniform thickness deposits adhering to the workpieces and being only slightly larger in diameter than said workpieces. It can be further observed from the drawing that the weld spatter deposits 18' have now been consolidated into said displaced weld material during said compaction step as a means of reducing the overall surface irregularities.

An external view is depicted in FIG. 3 of a preferred apparatus 20 which can be used in carrying out the present method. Specifically, said apparatus includes roller means 22 having a slot opening 24 defined between a roller member 26 which is spaced apart from a stationary block member 28. A pair of support members 30 and 32 between which said stationary block member 28 is suspended further include spring elements 34 and 36, respectively, in order to vary the width of the slot opening when the welded workpieces are positively fed therethrough. Positive feeding of said workpieces through the slot opening is accomplished with a series of parallel flute elements 38 that are located around the circumference of roller member 26 in an alignment transverse to the rotational direction of said roller member as shown. Conventional powered drive means (not shown) engage the central shaft member 40 on which said roller member 26 is mounted to provide the motive force which rotates the roller at relatively constant speed.

In operation, the welded together workpieces 42 can be simply fed by gravity forces to a location on the periphery of the roller member adjacent to the slot opening. Said workpieces will be gripped by the flute elements on the roller surface and fed into the slot opening automatically by rotation of the driven roller member. As the workpieces approach said slot opening, mechanical forces are exerted upon the weld flash diameter sufficient to cause its reduction by a compaction mechanism which displaces the weld material to both sides of the weld joint. Passage of the workpieces through the slot opening reduces the weldflash diameter along with any weld spatter deposits to a relatively uniform thickness slightly larger than the diameter of the workpieces. Any sizeable weldflash or weld spatter deposits causes the slot opening to enlarge at this time by compression of the spring loaded block member in said apparatus.

FIG. 4 depicts a different preferred apparatus of the present invention employing a pair of roller members having different diameters which rotate in opposite rotational directions. Accordingly, said apparatus 42 includes a pair of roller members 44 and 46 which are spaced apart to provide a slot opening 48 therebetween when a welded workpiece 50 is positively fed therethrough. Again, the positive feeding of said workpiece through the slot opening is accomplished with a series of parallel flute elements 52 that are located around the circumference of the larger diameter roller member 44. Both roller members 44 and 46 are interconnected by means of a pair of meshed gears 54 and 56, respectively, that are mounted on the shafts supporting said rollers. The gear member 54 which is mounted on the shaft 58 supporting the larger roller member 44 is driven by conventional power drive means (not shown) coupled to said shaft in the same rotational direction as said roller. The engagement of said gear member 54 with gear member 56, which is mounted on the shaft 60 supporting the smaller roller member 46, drives said roller member in an opposite rotational direction with respect to the rotational direction of the larger roller member 44. In said manner, it can be appreciated that both roller members will be traveling at different but constant surface speeds and with each roller rotating in opposite rotational directions.

It will be apparent from the foregoing description that various modifications can be made in the method and apparatus above specifically disclosed without departing from the spirit and scope of the present invention. For example, the apparatus itself can be hand-driven as well as power-driven and with the roller member or members being driven at varying rotational speeds in reducing the diameter of weld flash deposits on cylindrical workpieces. Likewise, said workpieces can be fed to the apparatus by many other known material handling mechanisms which do not utilize gravity feed or gravity removal of the workpieces from said apparatus. It is intended to limit the present invention, therefore, only by the scope of the following claims:

What I claim as new and desire to secure by Letters Patent of the United States is:

1. A method to reduce the size of weld flash located at the junction of two workpieces each having a cylindrical contour and which have been butt-welded together while not otherwise changing the physical dimensions of said workpieces comprising:
    (a) positively feeding the butt-welded workpieces downwardly by roller means including at least one horizontally disposed roller member oriented to rotate in a clockwise direction while said butt-welded workpieces are aligned transverse to the rotational direction through a horizontal exit slot opening smaller in width than the original diameter of the weldflash, said horizontal exit slot opening being defined by an open space between the rotating surface of said roller member and an opposing surface having the same alignment as said rotating surface, and with said exit slot opening being located below a larger size entrance opening formed between said roller member and said opposing surface, said slot opening further continuously diminishing in width between said entrance opening and said exit opening,
    (b) rotating said roller member about its axis,
    (c) imparting rotation to said butt-welded workpiece by said roller member during passage downwardly through said slot opening
    (d) allowing the width of said slot opening to be varied with spring means as the butt-welded workpieces are being fed downwardly therethrough,
    (e) exerting sufficient mechanical force with the sides of said slot opening to reduce the diameter of the weldflash only by compaction, and
    (f) discharging the workpieces from the exit opening.

2. A method as in claim 1 wherein the mechanical force being exerted by the sides of said slot opening arises from cooperative action between said rotating roller member spaced apart from a stationary block member serving as the opposing surface, and with said mechanical force being exercised solely by rotating the roller member to positively feed the butt welded workpieces downwardly through the continuously diminishing width slot opening, and wherein said feeding step comprises feeding said butt-welded workpiece between said rotating roller member and a spaced apart stationary block member serving as the opposing surface.

3. A method as in claim 1 wherein the mechanical force being exerted by the sides of said slot opening arises from cooperative action between a pair of roller members traveling at different rotational speeds in the same rotational direction and spaced apart from each other, one of said roller members serving as the opposing surface, and with said mechanical force being exercised solely by rotating the roller member to positively feed the butt welded workpieces downwardly through the varying width slot opening, and wherein said feeding step comprises feeding said butt-welded workpiece between a pair of roller members traveling at different rotational speeds with one of said roller members serving as the opposed surface.

4. A method as in claim 1 wherein the roller member grips the butt-welded workpieces which is carried out by providing flutes around the circumference of said roller member, and with said mechanical force being exercised solely by rotating the roller member to positively feed the butt-welded workpieces downwardly through the continuously diminishing width slot opening.

5. A method as in claim 1 which is carried out by maintaining the rotational speed of the roller member relatively constant, and with said mechanical force being exercised solely by rotating the roller member to positively feed the butt-welded workpieces downwardly through the continuously diminishing width slot opening.

6. A method as in claim 1 wherein the butt-welded workpieces are positioned in the roller means by gravity forces, and with said mechanical force beingexercised solely by rotating the roller member to positively feed the butt-welded workpieces downwardly through the continuously diminishing width slot opening.

7. A method as in claim 1 wherein the butt-welded workpieces are discharged from the slot opening by gravity forces, and with said mechanical force being exercised solely by rotating the roller member to positively feed the butt-welded workpieces downwardly through the continuously diminishing width slot opening.

8. A method as in claim 1 wherein the butt-welded workpieces are both positioned in the roller means and discharged from the slot opening by gravity forces, and with said mechanical force being exercised solely by rotating the roller member to positively feed the butt-welded workpieces downwardly through the continuously diminishing width slot opening.

9. A method as in claim 1 wherein the width of the slot opening is varied by mechanical spring action, and with said mechanical force being exercised solely by rotating the roller member to positively feed the butt-welded workpieces downwardly through the continuously diminishing width slot opening.

* * * * *